United States Patent
Lefebure

(10) Patent No.: US 8,214,088 B2
(45) Date of Patent: Jul. 3, 2012

(54) DEVICE FOR PILOTING A DRONE

(75) Inventor: Martin Lefebure, Courbevoie (FR)

(73) Assignee: Parrot, Paris (FR)

( * ) Notice: Subject to any disclaimer, the term of this patent is extended or adjusted under 35 U.S.C. 154(b) by 0 days.

(21) Appl. No.: 13/130,641

(22) PCT Filed: Nov. 19, 2009

(86) PCT No.: PCT/FR2009/052217
§ 371 (c)(1),
(2), (4) Date: Aug. 5, 2011

(87) PCT Pub. No.: WO2010/061099
PCT Pub. Date: Jun. 3, 2010

(65) Prior Publication Data
US 2011/0288696 A1   Nov. 24, 2011

(30) Foreign Application Priority Data
Nov. 27, 2008   (FR) ...................................... 08 06665

(51) Int. Cl.
*G05D 1/00* (2006.01)
(52) U.S. Cl. .............................. 701/2; 244/189; 244/190
(58) Field of Classification Search .................. 701/1–3; 382/103; 345/173; 244/135 A, 23 A, 24, 244/75.1, 189–190
See application file for complete search history.

(56) References Cited

U.S. PATENT DOCUMENTS

| | | | |
|---|---|---|---|
| 6,224,452 B1* | 5/2001 | Morse | 446/46 |
| 2002/0106966 A1* | 8/2002 | Jimenez et al. | 446/454 |
| 2002/0142699 A1* | 10/2002 | Davis | 446/37 |
| 2005/0048918 A1 | 3/2005 | Frost et al. | |
| 2008/0223993 A1* | 9/2008 | Spirov et al. | 244/23 A |
| 2011/0204187 A1* | 8/2011 | Spirov et al. | 244/190 |

FOREIGN PATENT DOCUMENTS

| | | |
|---|---|---|
| WO | 01/43473 | 6/2001 |
| WO | 2005/027550 | 3/2005 |
| WO | 2006/056231 | 6/2006 |
| WO | 2008/056051 | 5/2008 |

* cited by examiner

*Primary Examiner* — John Nguyen
*Assistant Examiner* — Michael Ng
(74) *Attorney, Agent, or Firm* — Haverstock & Owens LLP

(57) ABSTRACT

The device (10) for piloting a drone (8) comprises a housing having a tilt detector (12) for detecting tilts of the housing, and a touchpad (16) displaying a plurality of touch zones (30, 32, 34, 36, 38, 40, 42). A self-contained stabilizer system to stabilizes the drone in hovering flight in the absence of any user commands. The device comprises a controller controlled by a touch zone (30) forming an activation/deactivation button to cause the drone piloting mode to switch in alternation between an activation mode in which the self-contained stabilizer system of the drone is activated, in which mode said piloting commands transmitted to the drone result from transforming signals delivered by the touch zones and a deactivation mode in which the self-contained stabilizer system of the drone is deactivated, in which mode the piloting commands transmitted to the drone result from transforming signals emitted by the tilt detector of the housing.

13 Claims, 1 Drawing Sheet

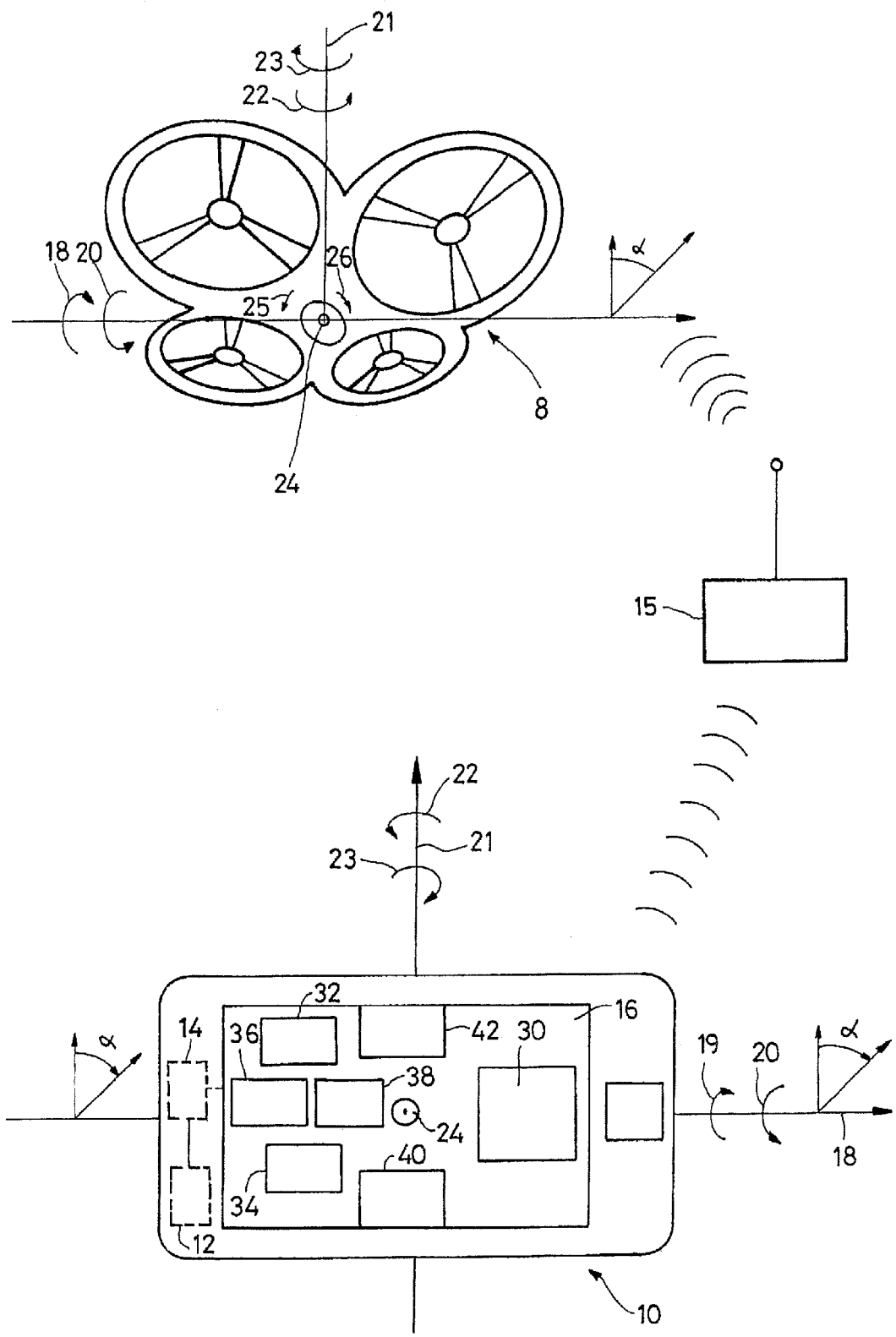

DEVICE FOR PILOTING A DRONE

FIELD OF THE INVENTION

The present invention relates to a device for piloting a drone, in particular a rotary-wing drone.

BACKGROUND OF THE INVENTION

A drone is a flying machine that is remotely piloted by means of a control device. Certain drones are said to be rotary-wind drones, which covers all types of scale models of known helicopters.

WO 2008/056051 A2 (Parrot) describes a game system using remotely-controlled toys, in particular remotely-controlled drones. The game is performed by piloting the drone on site, e.g. around a virtual circuit with the image of the circuit being superposed on the real image picked up by the camera of the drone. Virtual passing points are defined through which the drone must pass, and they are displayed, for example, in the form of virtual rings floating in the air.

As can be understood, in such a game it is necessary to be able to pilot the drone very accurately. The same applies to chase games in which a drone piloted by one player seeks to shoot down a stationary or moving target, for example a drone piloted by another player.

Until now, a drone has been piloted from a radio-control unit having two movable levers, in which:

for the first lever, a first axis controls pitching of the drone (in one direction to move forwards, or in the opposite direction to move backwards), while a second axis controls pivoting of the drone (tilting the lever in one direction to pivot to the left and in the opposite direction to pivot to the right); and for the second lever, a first axis controls the driving power of the drone (in one direction to increase the power and in the opposite direction to reduce it), while a second axis controls roll (in one direction to move crab-wise to one side and in the other direction to move crab-wise to the opposite side).

Specifically, learning to use the controls takes a long time and requires a great deal of practice, while running the risk of damaging the drone during the learning stage.

As a replacement for those levers, or in combination with them, it is also known to make use of buttons for piloting a drone.

US 2005/0048918 describes a control device for such a drone, specifically a miniature dirigible balloon, by using a control device of the portable telephone type. Key presses on the telephone are detected and transformed into commands for piloting the dirigible: accelerating or slowing down its drive, pivoting its rudder, etc. Simultaneously, a camera on board the dirigible picks up an image that is transmitted to the telephone and displayed on its screen.

A drone with a self-contained stabilizer system is described for example in WO 2009/109711 A2 (Parrot).

This type of drone is particularly suitable for inexperienced people who find it difficult to stabilize a rotary-wing drone using conventional lever controls operating the throttles, rolling, pitching, and yawing in more or less simultaneous and interdependent manner. These difficulties are often made worse when flying a radio-controlled scale model since the user has no force return and must therefore make do with seeing the machine and assessing its position in three-dimensional space, which requires a very good knowledge of the physics of flight in order to be able to interpret the position and understand what actions need to be undertaken in order to reach an equilibrium point.

The above-mentioned document describes a drone that is provided with automatic means for stabilizing the drone in hovering flight and serving in particular, once an equilibrium point has been reached, to provide the corrections that are needed to maintain such a stationary point by "trimming", i.e. by making numerous small corrections of variations in translation due to external effects, such as movement of the air and drifts of the sensors.

When automatically stabilized in hovering flight in self-contained manner, such as a drone thus enables people inexperienced in piloting, and in particular children, nevertheless to be able to pilot the rotary-wing drone without needing to act directly on traditional flight controls, but instead to take advantage of intuitive piloting based on horizontal and vertical movements. The dynamic movement of the drone is thus transformed into movement between successive equilibrium points by simple commands such as climb, descend, turn left or right, move forwards or backwards, etc., each command being associated with a particular button of the remote control housing. When the user releases all of the buttons, then the drone automatically returns to hovering flight, in the new position that it has reached.

Numerous devices are known that include tilt sensors, in particular portable telephones. WO 2005/027550 A1 (Nokia Corporation) describes such a portable telephone provided with means that enable the tilt of the telephone relative to the horizontal to be detected about two orthogonal axes.

WO 01/43473 A1 (Telbird Ltd.) describes how to use a telephone for remote control of various actions, e.g. moving a cursor through text displayed on a screen.

SUMMARY OF THE INVENTION

The invention is based on the observation that the mode of movement that consists in going from one equilibrium point to another, even though it greatly simplifies piloting for an inexperienced user, is not always the most effective mode of movement. This occurs in particular when rapid movements are required, for example making avoiding movements in chasing games, making rapid changes of drone attitude when seeking to aim at a moving target, etc.

For these reasons, it would be very desirable to have greater flexibility in the way in which the drone can be piloted as a function of context, with it being possible to have a mode of piloting that is more reactive in certain situations that require the user to take more direct control over the drone.

For this purpose, the invention provides a device for piloting a drone of the type described above, the device comprising: a tilt detector for detecting tilts of the device housing; a touchpad displaying a plurality of touch zones; means for detecting signals emitted both: by the tilt detector of the housing; and by the touch zones; and means for transforming said detected signals into piloting commands in order to transmit said piloting commands to the drone.

In a manner characteristic of the invention, the device further comprises means controlled by one of the touch zones that forms an activation/deactivation button to cause the drone piloting mode to switch in alternation between: i) an activation mode in which the self-contained stabilizer system of the drone is activated, in which mode said piloting commands transmitted to the drone result from transforming signals delivered by the touch zones; and ii) a deactivation mode in which the self-contained stabilizer system of the drone is deactivated, in which mode said piloting commands transmitted to the drone result from transforming signals emitted by the tilt detector of the housing.

Such a device relies on a complete redefinition of the man/machine interface for controlling maneuvers and for piloting commands.

Certain piloting maneuvers that require different actions to be taken by the operator on lever or button commands of the prior art can now be performed in intuitive manner by the operator merely by tilting the device of the invention: for example, in order to control a rotary-wing drone so as to move "forwards", it suffices for the user to tilt the accelerometer device about the corresponding pitching axis.

This mode of piloting is extremely reactive but it nevertheless gives rise to a relatively high level of instability in terms of drone equilibrium, so it should only be used when necessary, e.g. for performing fast movements, in chase situations, etc.

The advantage of the invention lies specifically in being able to activate this mode selectively, i.e. only when the user so desires, with the default piloting mode being the piloting mode with automatic and self-contained stabilization of the drone, the movement of the drone then being governed by commands that seek merely to move its stabilized point of equilibrium in three dimensions. This mode of operation is well adapted to slow stages of flight, to periods of watching or of approach in chase games, etc.

In order to go from one mode to the other, it suffices for the player to press on the activation/deactivation button of the touchpad, which can be done entirely intuitively without taking the eyes off the image of the scene picked up by the camera in the drone and displayed on the screen of the device.

In various subsidiary embodiments that are advantageous:
the device includes means for reinitializing the frame of reference of the device, which means are activated each time there is a switchover to said deactivation mode;
the device is a portable multimedia appliance of the cell phone and/or multimedia player type;
the touchpad includes at least four touch zones for controlling elementary piloting functions activated by making contact with said touch zones, said functions being functions of the group comprising: taking off; landing; climbing; descending; pivoting to the right; pivoting to the left; moving forwards; moving backwards; shifting to the right; and shifting to the left;
the device includes means for causing an automatic emergency landing to take place when the piloting device is turned upside-down; and
the device includes means for displaying on the touchpad an image as taken by a camera on board the drone.

The invention also provides a method of piloting a drone provided with a self-contained stabilizer system for stabilizing the drone in hovering flight in the absence of any user command, the method making use of a device as specified above and comprising the following steps:
detecting signals emitted by the touch zones and by the tilt detector of the housing;
in an activation mode in which the self-contained stabilizer system of the drone is activated, transforming into piloting commands signals that are emitted by said touch zones;
alternatively, in a deactivation mode in which the self-contained stabilizer system of the drone is deactivated, transforming into piloting commands the signals emitted by said tilt detector of the housing;
transmitting said piloting commands to the drone;
in said activation mode:
stabilizing the drone in hovering flight in the absence of any piloting commands coming from the device; and
moving the drone from one equilibrium point to another as a function of said piloting commands in the event of piloting commands being transmitted to the drone; and
alternatively, in said deactivation mode, controlling the movement of the drone by said piloting commands transmitted to the drone, these commands corresponding to elementary piloting commands activated by contact with said touch zones.

Said elementary piloting functions may in particular be functions from the group comprising: taking off; landing; climbing; descending; pivoting to the right; pivoting to the left; moving forwards; moving backwards; shifting to the right; and shifting to the left.

BRIEF DESCRIPTION OF THE DRAWINGS

There follows a description of an embodiment of the invention given with reference to the sole accompanying FIGURE.

FIG. 1 is a diagrammatic view of a piloting device and a drone suitable for being controlled by tilting said device in accordance with the invention.

DETAILED DESCRIPTION OF THE INVENTION

As stated above, the drone is typically a flying machine of small dimensions, such as a scale model helicopter possibly having a single rotor with an antitorque rotor, or a "flying banana" helicopter with twin rotors in tandem, or a "Kamof" helicopter having contrarotating coaxial rotors, or indeed a four-rotor machine, also referred to below as a "quadricopter" 8 (FIG. 1).

In accordance with the invention, elementary piloting functions are predefined for controlling the flight operations performed by the drone by means of actuators such as one or more engines, flaps, etc.

In this example, these functions comprise pitching, rolling, yawing, and varying altitude. As a reminder, these functions are explained below with reference to axes 18, 21, and 24 defining an orthogonal frame of reference:
pitching is tilting the drone relative to a first axis 18 lying in the plane of the quadricopter 8. Forward pitching 19 enables the drone to advance, while rearward pitching 20 causes the drone to move backwards;
rolling is tilting the drone about a second axis 21 lying in the plane of the quadricopter 8, and perpendicular to the first axis 18. A left roll 22 causes the drone 8 to move to its left while a right roll 23 causes the drone 8 to move to its right;
yawing is pivoting the drone 8 about its vertical axis 24, left pivoting 25 causing the drone 8 to turn to the left and right pivoting 26 causing the drone 8 to turn to the right; and
varying altitude comprises any vertical movement along the axis 24, whether in flight, i.e. climbing or descending, or else in order to start flying or stop flying, i.e. taking off or landing.

In addition to these conventional elementary functions, a drone 8 in accordance with the invention is capable for piloting purposes to implement specific elementary functions such as emergency landing or simulated firing at a target, these new functions being implemented as described below.

To summarize, these functions enable the following operations to be performed: takeoff, landing, emergency landing, climbing, descending, pivoting to the right, pivoting to the left, moving forwards, moving rearwards, shifting to the right, shifting to the left, and simulated firing on a target.

In order to activate at least one of these functions, the device 10 uses a tilt detector 12 connected to drone control means 14.

To transmit control signals to the drone 8, the means 14 may make use of wired or wireless technology, for example of the Bluetooth type (trademark filed by Bluetooth SIG, Inc.). Likewise, in another variant, the means 14 communicate with a relay transmitter 15 that relays control signals by radio.

In this embodiment, the elementary piloting functions controlled by tilting the control device 10 comprise pitching, rolling, emergency landing, and simulated firing.

The pitching axis 18, the roll axis 21, and the vertical travel axis 24 are shown relative to the control device 10 since any tilting of the device 10 relative to these axes is reproduced by the drone.

By way of example, tilting the control device 10 through an angle α relative to its pitching axis 18 causes the drone 8 to be inclined through such an angle α relative to its own pitching axis 18.

Under such circumstances, it is possible to pilot the drone by tilting the control device 10 so that, in practical manner, tilting of the device 10 is equivalent to tilting a virtual flight-control stick.

Furthermore, certain elementary functions are controlled in a manner that is specific to the invention. For example, an emergency landing or simulated firing on a target by the drone may be controlled respectively by turning the control device 10 upside-down or by moving it horizontally in a jerky manner.

In this preferred embodiment, the device 10 is a portable multimedia appliance, such as a cell phone of the iPhone type or a multimedia content player of the iPod Touch type (trademarks filed by Apple Inc., USA).

Such devices may also be provided with a touchpad 16 that is then used for activating/deactivating piloting by tilting the device and for controlling other elementary piloting functions by pressing on virtual buttons. More precisely, the touchpad 16 displays a button 30 that requires contact, typically from a thumb, in order to activate drone control by tilting the device.

This activation button serves in particular to ensure that the drone is stable when it is fitted with a self-contained stabilizer system such that, in the absence of any user command, the rotary wing drone keeps itself in equilibrium, i.e. hovering.

Thus, a user need merely lift the thumb away from the activation surface 30 so that the automatic system stabilizes the drone in the absence of any other piloting command.

In other words, the drone becomes stationary in the air by using commands that rely on measurements from actuators on board the drone, such as: an accelerometer, a gyro, an ultrasound telemeter providing its altitude, and/or a video camera enabling it to determine its speed, as explained in above-mentioned WO 2009/109711 A2.

This makes learning to pilot faster and more reliable since piloting commands no longer set out to stabilize the drone but rather to cause it to move from one equilibrium point to another.

Furthermore, deactivating drone commands implemented by tilting the control device makes it possible to eliminate any drift or error of the detector.

In other words, each time a drone command is activated by tilting the control device, the control frame of reference 20/21 is reinitialized.

The touchpad displays zones 32, 34, 36, 38, 40, and 42 such that the area defined by each of these zones serves to control an elementary piloting function.

In a manner analogous to a video game console, four zones 32, 34, 36, and 38 may be associated with four operations in two complementary pairs, such as climbing (zone 32) and descending (zone 34) or pivoting to the left (zone 36) and pivoting to the right (zone 38).

Under such circumstances, these four zones 32, 34, 36, and 38 are grouped together on the touchpad so as to define a control zone that is typical for a video game control stick.

Furthermore, a single zone 40 may be associated with the operations of landing or of taking off. Thus, making contact with this zone 40 either causes the drone to take off when it is on the ground, or else to land when it is in flight.

In addition, the zone 42 may be associated with an emergency landing of the drone, this emergency landing taking place more quickly than a conventional landing.

It should be observed that the control screen of the device 10 in accordance with the invention presents five control buttons for piloting the drone whereas a video game console requires eight contact or control buttons for performing such control.

Furthermore, the five buttons are situated in such a manner as to optimize piloting of the drone: the button for activating/deactivating piloting by tilting the device is accessible to the right thumb whereas the buttons that control pivoting and vertical movement of the drone are accessible to the left thumb, with the central buttons being accessible to the left or right thumbs.

To summarize, and as mentioned above, the elementary piloting functions in the method in accordance with the invention may be activated by means of buttons controlling elementary piloting functions such as:

| | |
|---|---|
| Dh | Advance |
| Db | Reverse |
| L | Pivot left |
| R | Pivot right |
| Dg | Shift left |
| Dd | Shift right |
| Dg + Dh | Anticlockwise bicycle turn |
| Dd + Dh | Clockwise bicycle turn |
| Ah | Climb |
| Ab | Descend |

These elementary functions are associated with automatic frequencies for taking off and landing.

The functions "Turn to the left" and "Turn to the right" may be made up respectively as "Pivot left" plus "Anticlockwise bicycle turn", and "Pivot right" plus "Clockwise bicycle turn", with the "Pivot" function being applicable while hovering and the "Bicycle turn" function applying when moving in translation.

Naturally, any other correspondence relationship may be established without going beyond the ambit of the invention.

In a variant implementation, certain elementary piloting functions may also be controlled by making tracks with a finger on the touchpad, for example:

| | |
|---|---|
| Track from center upwards | Forwards |
| Track from center downwards | Reverse |
| Track from center to the left | Shift left |
| Track from center to the right | Shift right |
| Anticlockwise circular track | Pivot left |
| Clockwise circular track | Pivot right |
| Track from center to top-right corner | Anticlockwise bicycle turn |
| Track from center to top-left corner | Clockwise bicycle turn |
| Track from bottom to top | Climb/takeoff |
| Track from top to bottom | Descend |
| Track from top to bottom and then horizontally | Land |

The present invention may be subjected to numerous variants. For example, an automatic emergency landing of the drone may be associated with turning the device upside-down, i.e. pivoting through 180° about the axis 18.

Finally, it should be observed that piloting a scale model by tilting a control device may be implemented not only for flying drones of the helicopter or airplane type, but also for scale models of ships, submarines, or land vehicles.

In another variant of the invention, the control device serves to display images taken by a camera on board the drone being piloted. The touchpad used for control purposes may also display images received by remote transmission.

Finally, in another variant, the control device may make use of voice recognition software for activating/deactivating an elementary piloting function such as simulated firing on a target.

The invention claimed is:

1. A device (10) for piloting a drone (8) provided with a self-contained stabilizer system for causing the drone to hover in the absence of any user commands, the device being characterized in that it comprises:
    a tilt detector (12) for detecting tilts of the device housing;
    a touchpad (16) displaying a plurality of touch zones (30, 32, 34, 36, 38, 40, 42);
    means for detecting signals emitted:
        by the tilt detector (12) of the housing; or
        by the touch zones (32, 34, 36, 38, 40, 42); and
    means for transforming said detected signals into piloting commands in order to transmit said piloting commands to the drone;
    the device including means controlled by one of the touch zones (30) that forms an activation/deactivation button to cause the drone piloting mode to switch in alternation between:
    an activation mode in which the self-contained stabilizer system of the drone is activated, in which mode said piloting commands transmitted to the drone result from transforming signals delivered by the touch zones; and
    a deactivation mode in which the self-contained stabilizer system of the drone is deactivated, in which mode said piloting commands transmitted to the drone result from transforming signals emitted by the tilt detector of the housing.

2. A device (10) according to claim 1, including means for reinitializing the frame of reference of the device, which means are activated each time there is a switchover to said deactivation mode.

3. A device (10) according to claim 1, wherein the device is a portable multimedia appliance of the cell phone and/or multimedia player type.

4. A device (10) according to claim 1, wherein the touchpad includes at least four touch zones (32, 34, 36, 38) for controlling elementary piloting functions activated by making contact with said touch zones (32, 34, 36, 38), said functions being functions of the group comprising: taking off; landing; climbing; descending; pivoting to the right; pivoting to the left; moving forwards; moving backwards; shifting to the right; and shifting to the left.

5. A device (10) according to claim 1, including means for causing an automatic emergency landing to take place when the piloting device (10) is turned upside-down.

6. A device (10) according to claim 1, including means for displaying on the touchpad (16) an image as taken by a camera on board the drone (8).

7. A method of piloting a drone (8) provided with a self-contained stabilizer system for stabilizing the drone in hovering flight in the absence of any user command, the method making use of a device provided with a tilt detector (12) for detecting tilts of the device and a touchpad (16) displaying a plurality of touch zones (32, 34, 36, 38, 40, 42), the methods being characterized by the following steps:
    detecting signals emitted by the touch zones and by the tilt detector of the housing;
    in an activation mode in which the self-contained stabilizer system of the drone is activated, transforming into piloting commands signals that are emitted by said touch zones (32, 34, 36, 38, 40, 42);
    alternatively, in a deactivation mode in which the self-contained stabilizer system of the drone is deactivated, transforming into piloting commands the signals emitted by said tilt detector (12) of the housing;
    transmitting said piloting commands to the drone;
    in said activation mode:
        stabilizing the drone in hovering flight in the absence of any piloting commands coming from the device; and
        moving the drone from one equilibrium point to another as a function of said piloting commands in the event of piloting commands being transmitted to the drone; and
    alternatively, in said deactivation mode, controlling the movement of the drone by said piloting commands transmitted to the drone, these commands corresponding to elementary piloting commands activated by contact with said touch zones (32, 34, 36, 38).

8. A piloting method according to claim 7, wherein said elementary piloting functions are functions from the group comprising: taking off; landing; climbing; descending; pivoting to the right; pivoting to the left; moving forwards; moving backwards; shifting to the right; and shifting to the left.

9. The method according to claim 7, wherein the device includes means for reinitializing the frame of reference of the device, which means are activated each time there is a switchover to said deactivation mode.

10. The method according to claim 7, wherein the device is a portable multimedia appliance of a cell phone and/or multimedia player type.

11. The method according to claim 7, wherein the touchpad includes at least four touch zones for controlling elementary piloting functions activated by making contact with said touch zones, said functions being functions selected from the group consisting of taking off; landing; climbing; descending; pivoting to the right; pivoting to the left; moving forwards; moving backwards; shifting to the right; and shifting to the left.

12. The method according to claim 7, wherein the device includes means for causing an automatic emergency landing to take place when the piloting device is turned upside-down.

13. The method according to claim 7, wherein the device includes means for displaying on the touchpad an image as taken by a camera on board the drone.

* * * * *